July 24, 1956
J. A. PERSSON ET AL
2,756,311
HIGH-SPEED TANDEM ARC WORKING
Filed March 24, 1954
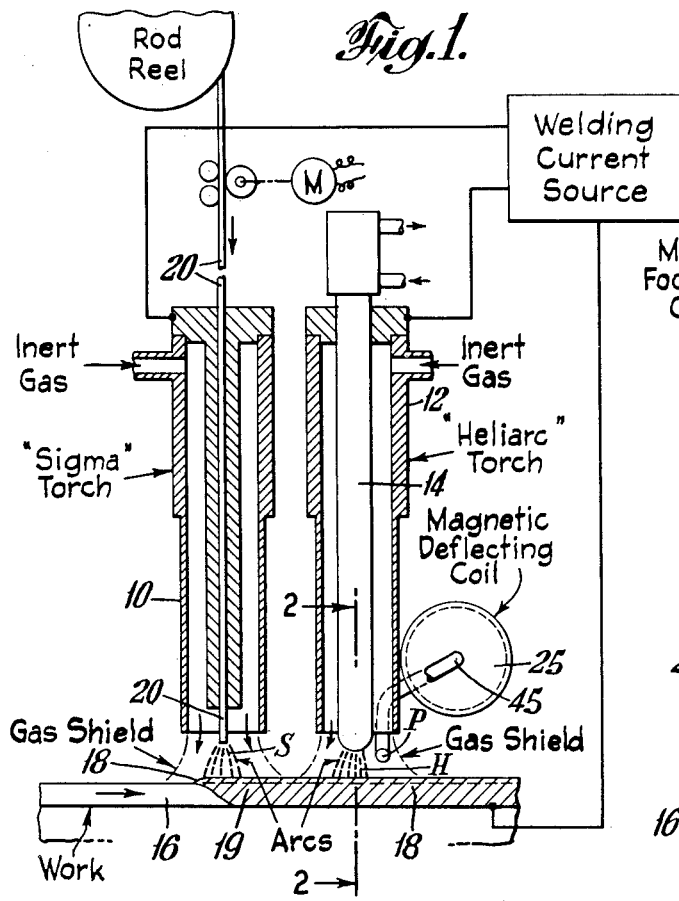
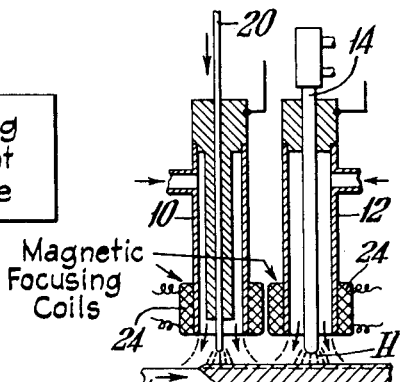
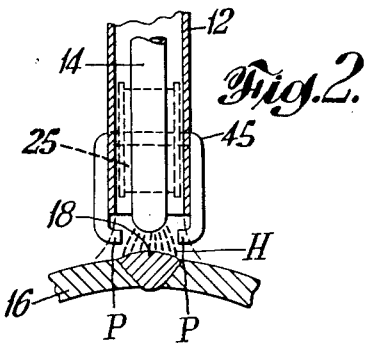
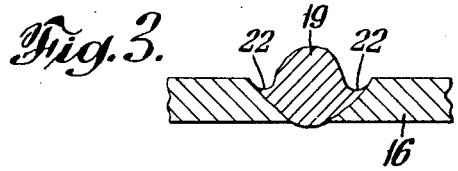
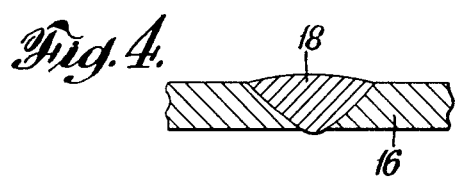
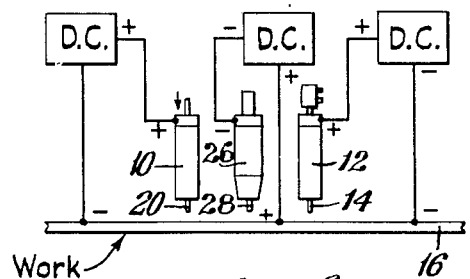
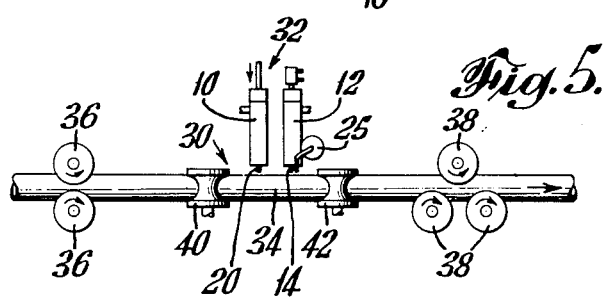
INVENTORS
JOHN A. PERSSON
JAN M. RUZEK
BY Barnwell R. King
ATTORNEY

United States Patent Office 2,756,311
Patented July 24, 1956

2,756,311

HIGH-SPEED TANDEM ARC WORKING

John A. Persson, Kenmore, and Jan M. Ruzek, Niagara Falls, N. Y., assignors to Union Carbide and Carbon Corporation, a corporation of New York Application March 24, 1954, Serial No. 418,416

8 Claims. (Cl. 219—8)

This invention relates to arc working and more particularly to multi-arc welding relatively thin sheets of metal, such as aluminum, at relatively high speeds, i. e., of the order of 360 inches/minute and higher.

The industrial trend in the joining of metals by arc welding is more pronounced today than ever before. In many instances, however, arc welding becomes a "bottleneck" due to the relatively low speeds, i. e., 240 inches/minute and lower, at which good welds can be made, thereby conflicting with other high-speed functions of an assembly line, for example. It would, therefore, be a major contribution to modern, stepped-up manufacturing processes if sound arc welds could be made at speeds which would eliminate such bottleneck.

Experiments along this line, specifically in arc welding processes, have revealed problem characteristics which seem inherent to welding at higher speeds, the most outstanding of which is undercutting. Undercutting may be defined as an improperly shaped weld where the arc forces displace a part of the molten metal in such a way that the fused zone of the workpiece is not filled with weld metal, leaving sharp notches which weaken the joint by creating zones of stress concentration.

It is, therefore, an object of this invention to provide an arc-welding method of producing sound welds, which are free of undercutting, at speeds considerably higher than those ever previously attained.

This object is accomplished, according to the present invention, by providing an arc welding method wherein two or more inert gas shielded electrodes in tandem arrangement are utilized, in which one arc effects the necessary penetration, and a subsequent arc eliminates the detrimental effects of the first arc by shaping the welding bead either without further penetration, or, where necessary, by further stepwise penetration. This is achieved by distributing the welding current in proper proportions among the arcs, employing suitable polarities on each electrode, and shielding the arcs in an essentially inert gas atmosphere.

In the drawing:

Fig. 1 is a view partly in side elevation and partly in section of a tandem arc welding set-up illustrating the invention;

Fig. 2 is a section taken along the line 2—2 of Fig. 1;

Figs. 3 and 4 are cross-sectional views of welds made without and with the invention, respectively;

Fig. 5 is a fragmentary view in side elevation of a tube mill comprising the invention;

Fig. 6 is a three-arc modification; and

Fig. 7 is a twin-arc modification.

Prior practice with multiple electrodes limits their use to the submerged-melt welding process in the welding of heavier gage metals at relatively low speeds. Other methods, such as (1) multiple consumable electrodes with a common consumable binder; (2) dual electrodes not in tandem arrangement but fed angularly to a common weld puddle; and (3) multiple electrodes with polyphase circuits; have not been found feasible for relatively high speed welding.

In welding at relatively high speeds with a single electrode, it has been found that severe undercutting results. In experiments with a tandem arrangement of two or more electrodes in inert gas shielded non-consumable metal electrode welding, i. e., welding hereinafter referred to as "tig" welding; and shielded-inert-gas-metal-arc welding, i. e., welding hereinafter referred to as "sigma." However, we have discovered that sound welds at even relatively high speeds (360 inches/minute and up) can be effected without undercutting. Muller et al. Patent No. 2,504,868 and Kennedy Patent No. 2,532,410 disclose examples of sigma welding; and Meredith Patent No. 2,342,086 discloses an example of "tig" welding.

An arc welding current of the order of 500 amperes is required to effect full penetration with a single inert gas shielded non-consumable metal electrode on 0.050 inch thick aluminum sheet at a speed of the order of 600 inches per minute. The resultant weld bead is rough, heavily undercut, and has a ropy appearance.

As an example of our invention a leading sigma welding torch 10 carrying a welding current of the order of 300 amperes and a trailing "tig" welding torch 12 with a water-cooled electrode 14 carrying a current of the order of 320 amperes, both employing DC–RP, were stationed in close tandem arrangement, Fig. 1, spaced ¾–1¼ inches between centers. Commercially pure argon gas, technical grade, fed at a rate of 30 cubic feet per hour, was used to shield each of the arcs. At a welding speed of 600 inches per minute, 0.050 inch thick aluminum sheets 16 were butt-welded at 18, Fig. 4, with completely satisfactory results. There was no evidence of undercutting, penetration was complete, and the additional metal fused with that of the workpiece 16 to form a smooth weld bead 18 along the entire seam.

Using our above method, the arcs were terminated prior to completion of the seam. The portion 19, Fig. 3, of the weld which had been subjected to the arc of the leading sigma welding electrode 20, but at which point the trailing refractory electrode 14 of torch 12 had not yet reached, evidenced complete penetration. However, considerable undercutting 22 and piping of the solidified bead were apparent. At the portion 18, Fig. 4, of the weld where the arc of the torch 12 was terminated, however, and for the entire length of the seam from that point to the start of the seam, a completely sound weld, as described above, was effected. It can be concluded, therefore, that the initial arc, although producing full penetration, required the shaping action of the trailing arc to produce a sound weld without any undercutting.

In multiple electrode arc welding, there is the problem of magnetic intereffects resulting from the current carried by each electrode. In the case of a leading sigma welding torch with DC–RP, and a trailing inert gas-shielded non-consumable or refractory metal electrode welding torch with DC–RP, there is a tendency for the magnetic field of the welding current of the sigma welding arc to draw the "tig" welding shaping arc forward to such an extent as to destroy the shaping tendency of the heat of the latter. The sigma welding arc is inherently strong and forceful, whereas the "tig" welding arc is comparatively soft and weak. In close proximity to each other, as is the case in the present arrangement, the leading sigma arc exercises a strong influence on the trailing arc H. Since the primary purpose of the "tig" welding torch is to shape the metal deposition of the sigma electrode, its arc should be as nearly vertical as possible or perhaps just slightly inclined forward to impinge even closer to the sigma arc, thus utilizing the heat produced by the leading torch in shaping the weld bead. In welding work of stainless steel or aluminum, the most suitable current is DC–RP. The water-cooled copper electrode 14 constituting the "tig" welding torch also utilizes DC–RP current. Since arcs of similar polarities attract, and since the sigma arc is considerably stronger, it therefore draws the "tig" arc forward to a near-horizontal position, thus depriving it of its weld-shaping ability to eliminate the produced undercutting. Focusing coils 24, Fig. 7, were used originally to eliminate this objectionable feature, but it was found that the current adjustments were critical and that any arc blowing would injure the coils 24.

An arc deflecting electromagnet comprising a coil 25 and a core 45, Fig. 1, was then developed by us and has proved to be extremely effective in controlling the attraction of the leading arcs to the trailing arc H in that the coil exercises its influence from a distance and, therefore, remains undamaged. At the same time, current can be supplied to the coil 25 to develop sufficient magnetic field between the poles P, P of the magnetic core 45 to alter the effect of the sigma arcs to the extent that, at the most, the "tig" welding arc will deflect only slightly forward.

However, the use of magnetic focusing coils 24, Fig. 7, provides an alternate method of controlling the arc H of the "tig" torch. We provide magnetic arc-focusing means 24, on the trailing torch at least, to offset this hazard. Such means comprises a suitable electromagnet or permanent magnet near the arc.

With a three-torch disposition in tandem of a sigma DC–RP torch 10, a "tig" DC–SP torch 26, and a "tig" DC–RP torch 12, Fig. 6, magnetic deflecting or focusing means are not required. With such disposition, using a welding current of the order of 300 amperes on the leading sigma electrode 20, 200 amperes on a middle tungsten electrode 28, and 180 amperes on a trailing, water-cooled metal electrode 14; and a flow of 30 cubic feet per hour of technical grade argon gas as the arc shield in each case, a weld was made on a 0.050 inch thick aluminum sheet 16 at a speed of 600 inches per minute, which evidenced no undercutting. Examination of the weld showed incomplete penetration by the leading arc and stepwise penetration by the second and shaping of the weld by the third arc.

Such factors as the number of electrodes, amount of current, voltage, polarity and deployment of "tig" and sigma torches, can be varied to meet existing problems. As the spacing between the electrodes is decreased, heating and magnetic effects require compensatory treatment, comprising lowering the current to minimize adverse magnetic effects and prevent overheating of the metal.

Where the leading electrode is provided by a sigma torch, full penetration can be effected by the initial arc, thus allowing for utilization of the subsequent arc, or arcs, for shaping. A stepwise penetration, however, can be achieved by using twin "tig" torches, each supplied with DC–RP current of the order of 500 amperes. For example, using an argon gas shield, a weld was made on 0.050 inch aluminum sheet at a speed of 650 inches per minute which, upon examination, showed partial penetration by the first arc and further stepwise and complete penetration, as well as shaping of the weld, by the trailing arc.

Speeds attained by employing the techniques of our invention are considerably greater than previously have been possible by prior arc welding processes. Maximum welding speeds of the order of 240 inches per minute have been achieved with but limited success in prior art arc-welding techniques. The welding speeds resulting from the present invention, therefore, represent a marked improvement in the application of high-speed welding to modern industrial methods.

The effectiveness of the trailing arc, or arcs, is augmented by the preheating effect of the work by the leading arc. The close tandem arrangement of the electrodes in conjunction with the high speed of travel allows for easier stepwise penetration and more efficient shaping of the weld by the second or third arc on a traveling weld seam the metal of which is already close to its fusion point.

A fairly recent development in the welding field concerns the manufacture of portable irrigation tubing. Aluminum is used to great advantage because of its low density and excellent corrosion resistance. In a prior commercial process, aluminum strip was continuously formed into a pipe which has a longitudinal seam welded by the "tig" process with DC–RP at a welding speed of the order of 180 inches per minute, maximum. Such speed was imposed by the prior welding operation, since a pipe-forming mill otherwise can be operated at a speed of the order of 900 inches per minute. Therefore, an increase in the speed of welding would effect substantial economies in the cost of fabricating such pipe.

Our arrangement, comprising a leading sigma welding torch and a trailing "tig" welding torch and using commercially pure argon as the shielding gas in each torch, has been employed for butt-welding aluminum at 750 inches per minute according to our invention. Fig. 5 illustrates the application of such arrangement to a pipe-forming mill 30 comprising a seam welding station 32 past which a pipe 34 is driven by horizontal sets of rolls 36 and 38 and vertical sets of rolls 40 and 42. The station 32 is provided with sigma and "tig" welding torches 10 and 12 arranged in tandem as shown in Fig. 1.

In the preliminary work leading to our invention, suitable welds with adequate penetration could not be produced with the "tig" welding process alone at such high welding speeds. Similarly, the sigma welding process alone presented considerable difficulties at welding speeds of over 240 inches per minute. The main disadvantage in the employment of the sigma process, as pointed out above, was the severe undercutting encountered on both sides of the welding bead. The two processes, "tig" and sigma, were combined in our novel tandem welding arrangement. The leading sigma torch supplied filler material, and the resulting bead had adequate penetration, but the sides were undercut as mentioned previously. The sigma bead was shaped, and the undercut was removed by the trailing "tig" torch.

The distance between the two welding arcs in tandem is important. The arc of the water-cooled (copper) electrode 14 of the trailing "tig" torch 12 has relatively low work-metal melting power, although it has relatively good current-carrying capacity. If the two torches are spaced too far apart, the temperature of the sigma welded bead and of the immediately adjacent base metal decreases appreciably before the weld reaches the trailing arc. Thus, the remelting and shaping actions of the trailing "tig" torch are insufficient. On the other hand, if the two torches are placed relatively close together, the remelting action of the trailing "tig" torch is adequate for eliminating the undercutting and shaping the sigma welded bead.

In testing the invention, aluminum alloy, Grade 3S–H14 (½ hard), 0.050 inch thick was used as the base metal. Oxweld No. 23, $1/16$ inch diameter wire, was used in the leading sigma torch. Both the leading sigma torch and the trailing "tig" torch were supplied with commercially pure argon. The basic arrangement involved stationary work and moving arcs. A hydraulically operated welding jig was used that was adjustable to provide a wide range of welding speeds from creeping speeds up to several thousands of inches per minute. The aluminum sheets ready to be welded were clamped to the table of the jig. Both torches were mounted in a holder that was propelled at the desired speed by the hydraulic mechanism.

As pointed out above, the distance between the two arcs in tandem is of importance and should be as short as possible. Specially modified "tig" and sigma welding torches were developed by us to satisfy this requirement. Slenderness of the torch assemblies was the objective. The sigma welding torch was a simplified standard torch, designed to accommodate $1/16$ inch diameter wire. The torch was assembled in a slender plastic holder, ¾ inch thick. Only the power cable was water-cooled. The "tig" torch was provided with a water-cooled copper electrode having replaceable electrode tip. The water-cooled copper electrode has the best current-carrying capacity with DC–RP. The arcs of the two torches were approximately 1-inch apart.

The placing of the two torches in tandem and so relatively close together presented a problem. The wire of the sigma welding torch and the non-consumable copper electrode of the "tig" torch, being conductors of fairly high currents, developed comparatively strong magnetic fields. Each of these fields tended to deflect the opposite arc in such a way that the arcs were actually attracted. It was observed that this attraction was at times of such strength that the arcs, especially the "tig" welding arc, failed to provide any welding action. Magnetic arc focusing coils 24, Fig. 7, supplied with direct current, were placed on the gas cups of both torches of the tandem to counteract interference between the magnetic fields of such arcs.

The gas flow of both torches was kept constant at a rate of 40 cubic feet per hour. The wire feed of the sigma welding torch was about 30 feet per minute. The current supplied to the "tig" torch was 200 to 220 amperes. High-frequency alternating current was superimposed on the trailing torch at the start of the welding cycle to initiate and to stabilize the arc at the beginning of the weld. The sigma torch was supplied with a current of 320 amperes. The current on both torches was direct current-reverse polarity. The welding speed was kept constant at 750 inches per minute.

The arc-deflecting means 25, Fig. 1, however, was subsequently found to be superior for the reasons pointed out above.

The process of the invention is not limited to the number of electrodes employed nor to the thickness or nature of the workpiece.

We claim:

1. High-speed tandem arc welding which comprises relatively moving metal work to be welded at a speed of the order of 360 inches/minute and upwards, and an arc welding station containing at least two gas shielded fusible and refractory electrode-arcs in tandem, welding such work with a leading arc so that the resulting preliminary weld is fully penetrated but undercut, and shaping such weld by melting the metal thereof with a trailing arc so that such undercutting is removed and the resulting final weld is smooth and sound.

2. High-speed tandem arc welding as defined by claim 1, in which two arcs are used, the leading arc being a consumable electrode-sigma welding arc and the trailing arc being an inert gas shielded non-consumable electrode-welding arc.

3. High-speed tandem arc welding as defined by claim 2, in which the work is sheet aluminum, the sigma welding electrode is aluminum, and the shielding gas is argon.

4. Tandem arc welding sheet metal work at a relative torch-to-work speed of the order of 600 inches/minute and upwards, which comprises relatively moving the work and a welding station provided with a series of three arc welding torches arranged in line above the work and spaced as close together as their structures permit, the leading torch being of the sigma welding type and the subsequent torches being of the inert gas shielded non-consumable electrode type, supplying direct current at reverse polarity to said leading torch and the work and to the trailing torch and such work, supplying direct current at straight polarity to the middle torch and the work, forming welding arcs between the work and the electrodes of each of such torches, the work and station moving in the direction of the welding seam at a relative speed of at least 600 inches/minute, the leading metal-arc welding the work with a fully penetrated but undercut weld, and the subsequent arcs shaping such weld by melting the metal thereof so that it flows into and fills the undercut sides, leaving a smooth and round final weld.

5. A fusion welding station comprising a consumable electrode-sigma welding torch and an inert gas shielded non-consumable electrode-arc welding torch arranged in relatively closely spaced tandem relation, said station being provided with means for controlling the arcs so that magnetic interference therebetween is avoided.

6. A fusion welding station as defined by claim 5, in which such arc controlling means comprises a magnetic arc-focusing coil mounted on the inert gas shielded non-consumable electrode-arc welding torch.

7. A fusion welding station as defined by claim 5, in which such arc controlling means comprises an arc deflecting electromagnet including a transverse coil provided with pole pieces arranged on opposite sides of such inert gas shielded non-consumable electrode-arc.

8. An arc working station comprising a sigma torch, an inert gas shielded refractory metal electrode torch, and an inert gas shielded water-cooled metal electrode torch arranged in relatively close spaced tandem arrangement, means for supplying direct current at reverse polarity to said sigma torch and said inert gas shielded water-cooled metal electrode torch, and means for supplying direct current at straight polarity to said inert gas shielded refractory metal electrode torch, such polarities having the effect of permitting the arcs of said torches to operate without interference due to the magnetic fields induced thereby.

References Cited in the file of this patent

UNITED STATES PATENTS

| | | |
|---|---|---|
| 1,298,590 | Smith | Mar. 25, 1919 |
| 2,489,002 | Babbitt | Nov. 22, 1949 |
| 2,504,868 | Muller et al. | Apr. 18, 1950 |